United States Patent [19]

Barker

[11] 4,252,085

[45] Feb. 24, 1981

[54] ANIMAL TWITCH

[76] Inventor: Ronald E. Barker, 3442 NW. Upas Ave., Redmond, Oreg. 97756

[21] Appl. No.: 38,589

[22] Filed: May 14, 1979

[51] Int. Cl.³ ............................................ A01K 15/00
[52] U.S. Cl. ..................................................... 119/96
[58] Field of Search ............... 119/96, 108, 109; 54/1, 54/34

[56] References Cited

U.S. PATENT DOCUMENTS

| | | | |
|---|---|---|---|
| 147,920 | 2/1874 | Fallin | 54/34 |
| 1,073,226 | 9/1913 | Freeman | 54/34 |
| 1,166,708 | 1/1916 | Murray | 119/96 |

*Primary Examiner*—Jay N. Eskovitz
*Attorney, Agent, or Firm*—Kolisch, Hartwell & Dickinson

[57] ABSTRACT

A twitch for use in controlling an animal bound to a lead rope. The twitch includes an elongate, L-shaped member having attached at one end thereof a flexible, looped cord which is twistable about a portion of the animal's lip, when the member is rotated, to secure the cord tightly to the lip. A ring attached to the other end of the member is adapted to receive the lead rope therethrough to prevent the twitch—in its twisted configuration—from unwinding.

5 Claims, 3 Drawing Figures

ANIMAL TWITCH

BACKGROUND AND SUMMARY

The present invention relates to an animal twitch, and more particularly to a twitch which is twistable to tightly clamp a portion of an animal's lip and which can be maintained in its twisted configuration by engagement with a lead rope attached to the animal.

Twitches used to control an animal during a shoeing or veterinary operation or the like are known in the prior art. One type of twitch known includes a flexible looped cord adapted to be twisted tightly about a portion of the animal's lip. Absent any provision for maintaining the twitch in its twisted configuration, the person performing the operation on the animal, or an additional person, is required to hold the twist-configured twitch with one hand. Another type of twitch known in the prior art is a nutcracker device having a pair of jaws which are tightly clampable about a portion of the animal's lip, permitting one-man operation. The nutcracker type device is inherently more complex, and hence more expensive than the above-described loop-type twitch.

It is a principal object of the present invention to provide a simple loop-type animal twitch designed to permit one-man operation.

More specifically, it is an object of the present invention to provide a horse twitch which may be secured about a portion of the animal's lip, and maintained in securing position by engaging the twitch with a lead rope attached to the animal.

The present invention includes an elongate, generally L-shaped body member having attached at one end thereof an elongate, flexible looped cord which is twistable about a portion of an animal's lip when the twitch is rotated in one direction, to tighten the cord about the animal's lip. Provided at the other end of the body member is a ring for receiving therethrough a lead rope attached to the animal, wherein the twist-configured twitch is prevented from rotating in the opposite direction.

These and other objects and features of the present invention will become more fully apparent when read in connection with the following detailed description of a preferred embodiment of the invention and the accompanying drawings.

DRAWINGS

DETAILED DESCRIPTION OF A PREFERRED EMBODIMENT OF THE INVENTION

Figures 1, 2, 3:
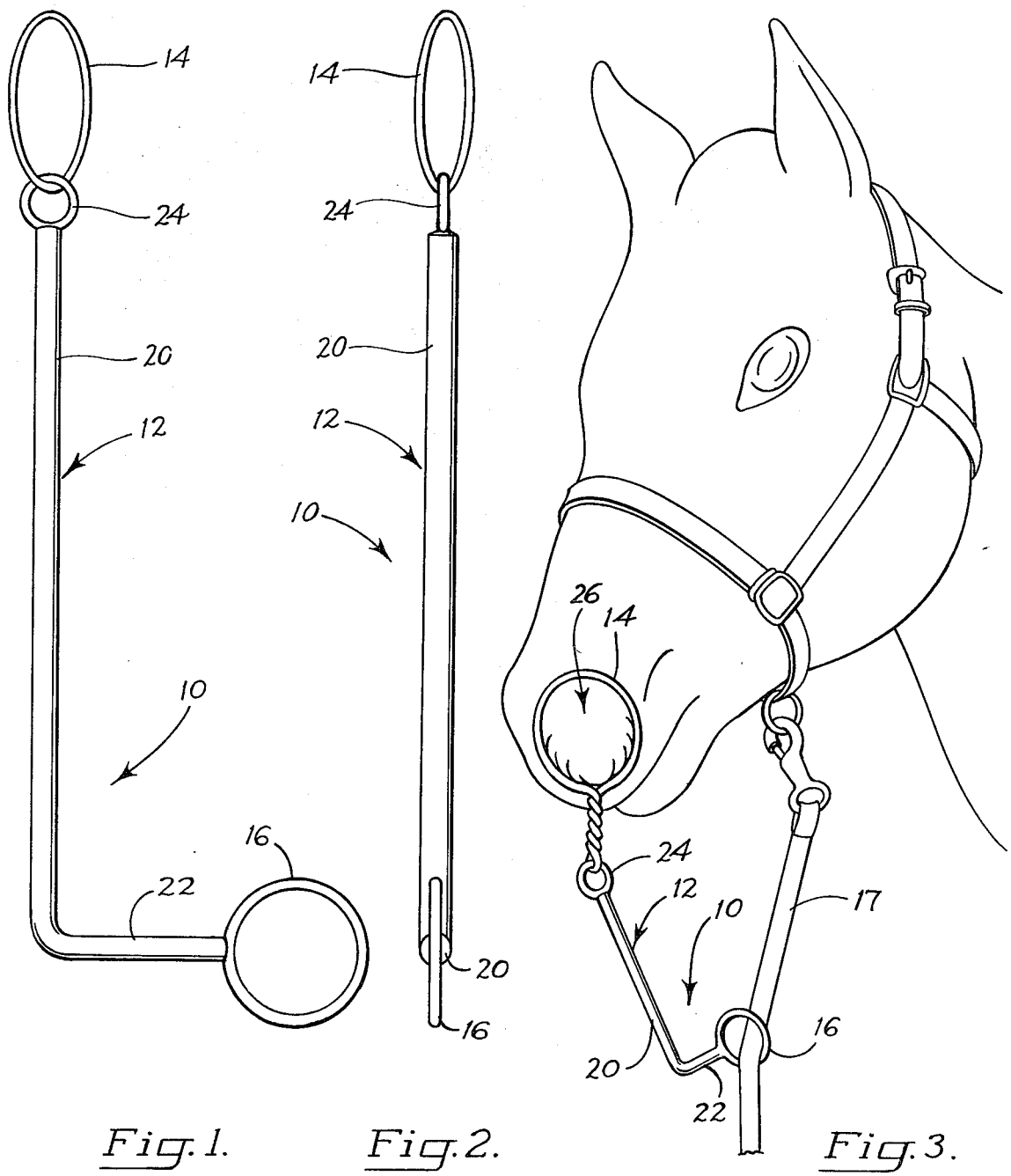
FIG. 1 is a side elevation view of a twitch constructed according to a preferred embodiment of the invention.
FIG. 2 is a front view of the twitch.
FIG. 3 shows the twitch in operative condition.

Referring now to the drawings, there is shown at 10 a twitch constructed according to a preferred embodiment of the invention. Twitch 10 generally comprises an elongate member 12 having attached at its upper end in the figures an elongate, looped flexible element, or cord 14, which is used to secure the twitch to a portion of an animal's lip, in a manner to be described. Attached to the lower end of member 12 in the figures is a substantially rigid ring 16 providing means for engaging a lead rope 17 attached to the animal (FIG. 3), for a purpose to be described.

Member 12 includes a first leg portion 20 to which cord 14 is attached, and a second, somewhat shorter leg portion 22 formed with the first leg portion and extending at a substantial angle relative thereto. In the embodiment shown, member 12 is substantially L-shaped, with the two just-mentioned leg portions forming a 90° angle therebetween.

Cord 14 is a loop formed of a continuous strand of rope, flexible plastic, leather, light chain, or the like, which is attached to member 12 through a ring 24 attached to the upper end of leg portion 20. Alternatively, loop 14 may be formed of an elongate piece of cord material, with the two ends of such piece being attached in a conventional manner to the upper end of leg portion 20 in the figures.

The manner of using the just-described horse twitch will be described with reference to FIG. 3. The person using the twitch initially places cord 14 over a portion of the horse's lip, indicated at 26 in the figure, and rotates member 12 to twist cord 14 in the manner shown. Rotation of member 12 in one direction is continued until the portion of the captured lip is tightly bound within the looped portion of the twisted loop. It can be appreciated that leg portion 22, extending outwardly from leg portion 20 about which the twitch is rotated, provides a moment arm by which torque can be applied to member 12 in twisting the twitch.

It can be appreciated that the twitch, once twisted tightly about the horse's lip in the manner just described, has a tendency to untwist by reverse rotation. By the novel construction of the present invention, the twitch is prevented from such reverse rotation by engaging ring 16 with lead rope, or rein 17, attached to the horse's bridle, as shown. Specifically, after placing twitch 10 in its binding position as illustrated, rope 17 is passed through ring 16, preventing rotation of member 12. Here leg portion 22 acts as a lever arm in resisting the tendency of the twitch to unwind.

The twitch is, of course, easily released from the horse after the desired operation or procedure has been performed, simply by drawing rope 17 out of ring 16, and allowing the twitch to untwist.

It may now be appreciated how the above-mentioned objects of the invention are met. The instant horse twitch allows the user to easily capture a portion of the horse's lip tightly within loop 14. Once such capture has been effected, the twitch can be maintained in a capturing position simply by engaging ring 16 with the horse's lead rope. The construction of the instant invention is very simple and inexpensive, requiring only an angle member with a looped cord at one end and a ring at the other end. Thus, there are no mechanical connections to increase expense or weight of the twitch.

While a preferred embodiment of the invention has been described herein, various changes and modifications may be made without departing from the spirit of the invention.

It is claimed and desired to secure by letters Patent:

1. A twitch for use in controlling an animal bound to a lead rope, the twitch comprising an elongate body member, an elongate flexible element extending as an endless loop, means at one end of said body member attaching the flexible element to the body member and providing the sole attachment for said element to said body member, said loop which is formed by the flexible element being twistable about a portion of the animal's lip when said member is rotated in one direction, to secure said flexible element tightly thereto, and engaging means associated with the other end of said member for engaging such lead rope to prevent reverse rotation.

2. The twitch of claim 1 wherein said member has a first leg portion and a second leg portion joined to the first leg portion and extending at a substantial angle relative to said first leg portion, said loop formed by said flexible element being attached to an end of said first leg portion and said engaging means being attached to an end of said second leg portion.

3. The twitch of claim 1 or 2 wherein said member is substantially L-shaped.

4. The twitch of claim 2, wherein the means attaching the loop formed by said flexible element comprises a ring, and said loop extends through said ring.

5. A twitch for use in controlling an animal bound to a lead rope, the twitch comprising
   an elongate, generally L-shaped body member,
   an elongate, flexible, endless element attached to one end of said member, said flexible element being twistable about a portion of the animal's lip when said member is rotated in one direction, to tighten said element on the lip, and
   means associated with the other end of said member for receiving such lead rope therethrough to prevent reverse rotation.

* * * * *